US006818300B2

(12) United States Patent
Loyd et al.

(10) Patent No.: US 6,818,300 B2
(45) Date of Patent: Nov. 16, 2004

(54) METHODS AND MIXTURES FOR COATING GLASS WASTE

(75) Inventors: Dennis Dean Loyd, West Chester, OH (US); Larry Lee Lough, Springdale, OH (US)

(73) Assignee: Tri E Holding, LLC, Fairfield, OH (US)

( * ) Notice: Subject to any disclaimer, the term of this patent is extended or adjusted under 35 U.S.C. 154(b) by 35 days.

(21) Appl. No.: 10/328,561

(22) Filed: Dec. 23, 2002

(65) Prior Publication Data

US 2004/0121078 A1 Jun. 24, 2004

(51) Int. Cl.$^7$ .................... B32B 27/04; B32B 27/38; B05D 7/00; B05D 3/02; C03C 17/32
(52) U.S. Cl. ................ 428/406; 428/407; 428/413; 427/212; 427/215; 427/221; 427/299; 427/386; 427/421; 65/21.1; 65/60.3; 523/400
(58) Field of Search ................ 427/212, 213.3, 427/213.31, 213.32, 213.33, 215, 218, 220, 221, 222, 299, 314, 372.2, 384, 385.5, 386, 389.8, 421, 430.1; 428/524, 332, 334, 335, 336, 337, 402, 403, 404, 406, 407, 413, 417, 423.1, 425.6, 426, 435, 436, 438, 439, 440, 441, 442, 473.5, 474.4, 489, 497, 500, 523; 65/60.1, 60.3, 61, 62, 21.1, 21.5; 523/400

(56) References Cited

U.S. PATENT DOCUMENTS

| 4,256,232 | A  |   | 3/1981  | Hannon et al. ........... 215/12 R |
| 5,364,672 | A  | * | 11/1994 | Schultze-Kraft ............. 428/15 |
| 5,375,777 | A  | * | 12/1994 | Pehrson ...................... 241/22 |
| 6,029,477 | A  | * | 2/2000  | Hanvey, Jr. .................. 65/483 |
| 6,333,371 | B1 | * | 12/2001 | Hashimoto et al. ......... 524/100 |
| 6,340,650 | B1 | * | 1/2002  | Haun ......................... 501/155 |
| 6,596,074 | B2 |   | 7/2003  | Pomeroy .................... 106/712 |

FOREIGN PATENT DOCUMENTS

| DE | 19807681 A1   | 8/1999  | ........... C04B/26/10 |
| GB | 1588132       | 4/1981  | ........... C08K/3/40  |
| GB | 1604405       | 12/1981 | ........... C08K/3/00  |
| WO | WO 02/076904 A2 | 10/2002 | ........... C04B/28/00 |

* cited by examiner

Primary Examiner—Randy Gulakowski
Assistant Examiner—Michael J. Feely
(74) Attorney, Agent, or Firm—Schwegman, Lundberg, Woessner & Kluth, P.A.

(57) ABSTRACT

Methods are provided for coating glass waste. A mixture including a universal resin, a curing agent, a flow modifier, and a colorant is applied to the glass waste. The glass waste is then cured. In some embodiments, the mixture is sprayed onto the glass waste. In an alternative embodiment, the mixture is mixed with the glass waste.

21 Claims, 2 Drawing Sheets

METHODS AND MIXTURES FOR COATING GLASS WASTE

FIELD OF THE INVENTION

The present invention is related to treatment of glass waste, and more specifically to methods and mixtures for coating glass waste.

BACKGROUND OF THE INVENTION

Glass waste has created enormous challenges for the waste disposal and glass recycling industries. This is so, because glass waste includes deposits of heavy metals, such as lead that can leach out into the environment from the glass waste. In turn, the heavy metals can enter a municipality's sewage and water supply causing detrimental environmental affects.

Moreover, recycling glass is manually intensive and expensive. This is so because one vendor of glass may use different concentrations of lead in their glass products than another glass vendor. As a result, in order to recycle the glass waste, the waste must be separated into vendor specific categories so that each vendor receives glass waste that can be reused by them. Glass waste with different concentrations of lead will melt, spread, and solidify at different temperatures, and therefore glass vendors can only reuse glass waste that has the proper amount of lead concentrations that is used in their glass manufacturing process.

Because of the expense and time consuming nature associated with recycling glass waste, many waste disposal facilities have resorted to illegal disposal of glass waste. This is where the glass waste is not properly treated according to state and federal Environmental Protection Agencies (EPAs). This is extremely dangerous to the people that live near any such facility.

Glass waste associated with computer monitors, such as Cathode Ray Tube (CRT) monitors, and television sets are particular troublesome for glass recyclers and waste disposal facilities, because these monitors include high levels of lead. In the past, one solution has been to ship these monitors to other countries for disposal, such as China. However, in recent years these third-world or developing countries have started to refuse these monitors because of the health hazards this waste has created for their citizens.

Presently, a popular and temporarily legal technique for disposing of computer monitors is a smelting technique. A smelting process melts the glass of the monitor at an extremely high temperature and then extracts the lead off the top of the liquid produced. However, the EPA has authorized this process only as a stopgap measure since until recently no other viable technique existed to safely dispose of monitor glass. The reason why the EPA has only temporarily authorized this processes is because the process produces toxic gas as a byproduct and cross contaminates the glass with other toxins. Some toxins and other heavy metals produced by the smelting process include Selenium arsenic. Therefore, the EPA realizes that it cannot continue to permit the smelting process to continue indefinitely and is actively pursuing and promoting research to replace the process.

Another recent technique attempts to create a specialized clay mixture that is mixed with the glass waste, with the assumption that waste will adhere to the clay, and the clay will absorb any heavy metals that leach out from the glass waste. However, over time the heavy metals will leach out from the clay and into the environment. Thus, this technique does not appear to be a solution to the problem and may only delay future environmental catastrophes.

CRT disposal or television disposal is a major environmental challenge for the United States, this challenge continues to escalate as more and more organizations and people continue to buy and dispose of CRT monitors and televisions at alarming rates. Currently, CRT waste is the number two contributor to hazardous lead waste in the United States. This problem will only continue to grow over the next several years as liquid crystal and/or plasma screen technology is integrated into the industry and individuals/organizations accelerate their disposal rates of the CRT monitors.

However, very recently Tristate "E" Recycling of Ohio introduced methods and systems that can efficiently and environmentally treat glass waste. These methods and systems crush the glass waste to extremely small glass particles. The particles are then treated in an acid solution that removes heavy metals from the surface of the particles. The acid solution and particles are mixed for a period of time, and then the particles are rinsed. The remaining particles are environmental safe because the diameter of each particle is small enough that even under extreme circumstances and forces no heavy metal will leach into the environment.

However, presently even glass waste that is environmentally safe is used for the sole purpose of disposing the glass waste or recycling the glass back to the original glass manufactures. That is, the entire industry has been consumed with efficiently and economically disposing of glass waste or reusing the glass waste in products that originally produced the glass waste (e.g., CRT monitors, televisions, and the like.

Moreover, even glass waste that is not environmentally hazardous, such as household products (e.g., beverage glasses), is not capable of being pigmented to a different color during any subsequent recycling process. Accordingly, there are presently no known or published techniques for further treating glass waste or re-coloring glass waste to make useful and new products that can be introduced into the marketplace.

Therefore, there is a need for new techniques that coat glass waste and can re-color the glass waste to other colors not originally associated with the glass waste. These coating techniques should further ensure the safety of the glass waste and permit a variety of new uses and products associated with the glass waste in the marketplace.

SUMMARY OF THE INVENTION

Briefly and in general terms, methods are provided for coating glass waste that has been made environmentally safe. The coating on the glass waste makes the waste more environmentally safe by further encapsulating any residual heavy metals on the waste. The coating can also include coloring to give the glass waste desired visual appearances. Once coated the glass waste can be safely used in a variety of products, such as, and by way of example only, garden mulch, playground mulch, decorative landscaping, road coatings, and the like.

More specifically, and in one embodiment, a method to coat glass waste is presented. The glass waste is coated with a mixture. The mixture includes a universal resin, a solvent, a flow modifier, an adhesion modifier, a curing agent, and a colorant. Next, the coated glass waste is cured.

Still other aspects of the present invention will become apparent to those of ordinary skill in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description and the drawings illustrate specific embodiments of the invention sufficiently to enable those of ordinary skill in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

In various embodiments of the present invention, glass waste can include glass waste that is initially hazardous if not properly treated, such as CRT,glass waste, television glass waste, and the like. Moreover, glass waste can include household glass waste such as colored or uncolored beverage glasses or other household glasswares.

Devices and systems that are readily available and modifiable by one of ordinary skill in the art are used to achieve the tenets of the present disclosure. Accordingly, when these devices are assembled and/or modified to achieve the teachings of various embodiments of the present invention, the assembled or modified systems are intended to fall within the broad scope of the present disclosure.

Figure 1:
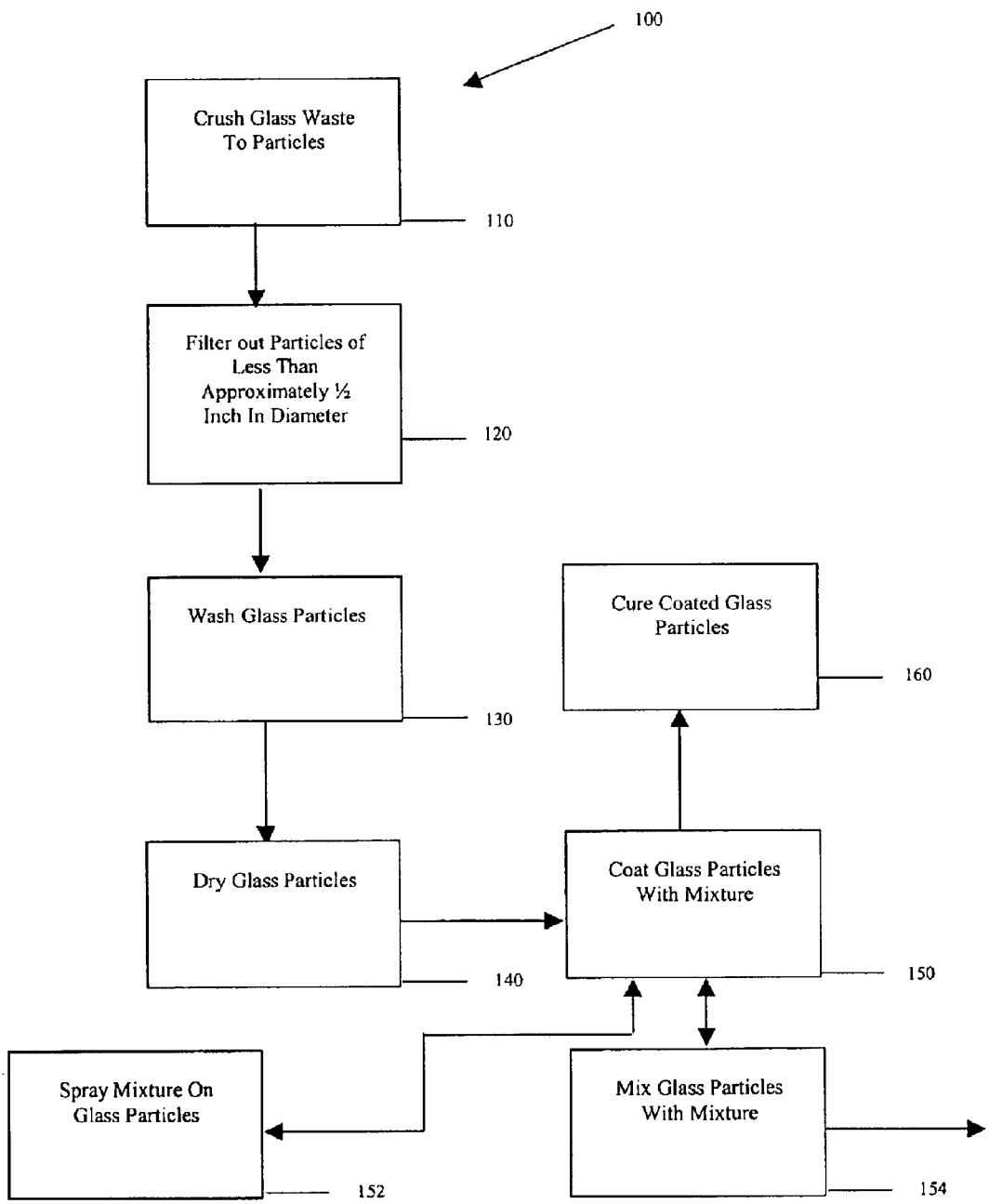
FIG. 1 is a flowchart of a method for coating glass waste, according to one embodiment of the present invention.

FIG. 1 illustrates a flowchart of one method 100 for coating glass waste, according to one embodiment of the present invention. Initially, glass waste is acquired. The glass waste can be from CRT monitors, television monitors, or any other hazardous glass waste that is initially treated to be environmentally safe. In one embodiment, any hazardous glass waste is treated by a decontamination process provided by Tri-state "E" Recycling of Ohio, as discussed above. In other embodiments, the glass waste is not deemed hazardous, such household glassware and the like.

Initially, the acquired glass waste is crushed at 110 into glass particles, where the diameter of the glass particles is less than approximately ½ of an inch and greater than 1 millimeter in diameter, but can be of different diameter dimensions. At 120, the glass particles conforming to the appropriate diameter dimensions are filtered out and any remaining glass waste not so conforming is re-crushed until the appropriate diameters for all the remaining glass waste is achieved.

Next, at 130 the glass particles are optionally washed to remove any debris that may be adhered or mixed in with the glass particles. At 140, the washed glass particles are optionally dried. The particles that are optionally dried can be dried by air-drying the particles, subjecting the glass particles to an oxidation process, subjecting the glass particles to convection heating process, subjecting the glass particles to a catalytic chemical reaction, subjecting the glass particles to radiation bombardment, subjecting the glass particles to an infra light source, and others.

After the glass particles have been dried, at 150, the glass particles are coated with a mixture. The mixture includes a universal resin, a curing agent, a flow modifier, and a colorant. The universal resin can include epoxies, phenol formaldehyde resins, amino resins, polyamides, Polyester resins, vinyl resins, acrylic resins, polyurethane resins, cellulosic resins, bitumen rosins, lignin rosins, wood rosins, gum rosins, and the like. The curing agent can include amines, isocyanides, photo initiators, acids, or bases. The flow modifier can be any flow modifier available and known to one of ordinary skill in the art. The colorant can include organic pigments, inorganic pigments, iron oxides, dyes, or any other color imparting compounds.

In some embodiments, the mixture also includes a solvent. The solvent can include organic liquids such as water, alcohols, aromatic solvents, aliphatic solvents, esters, glycols, and the like. In still more embodiments, the mixture includes other additives, such as, but not limited to, adhesion modifiers, abrasion modifiers, Ultra Violet (U.V.) absorbers, and others.

In one embodiment, the mixture includes 10% to 90% of the universal resin, 1% to 20% of the curing agent, 0.1% to 5% of the flow modifier, and 0.1% to 40% of the colorant. Moreover, in some embodiments, the mixture includes 0.1% to 5% of an adhesion modifier and 0.1% to 40% of a solvent.

In one example embodiment, the mixture includes a water-soluble epoxy resin, an amine-curing agent, a flow modifier, an adhesion agent, a colorant, and water. The colorant can be pigmented to any desired color that the glass particles are desired to be.

Once the mixture is created it can then be coated on the glass particles as depicted at 150. In one embodiment, at 152, a sprayer is used to coat the glass particles. The spraying applies the mixture to the surface of the glass particles where it adheres to the glass particles. Spraying continues until the glass particles are uniformly coated with the mixture. The thickness of the mixture applied to the glass particles can be anywhere from 0.1 micron to more than 200 microns.

Alternatively, at 154, the mixture can coat the glass particles by mixing the glass particles with a liquid form of the mixture in a container. For example, the mixture is melted and mixed with the glass particles. In these embodiments, a colorant or other additives may not be used in the mixture; rather the mixture can be a thermoplastic resin such as polyethylene. This may be desired to keep the existing color of the glass particles and the polyethylene is used to further smooth the glass particles rough edges and/or further encapsulate any heavy metals that may remain on the glass particles.

In still other embodiments, the mixture can be applied to the glass where the mixture is applied as an U.V. or Electron Beam (E.B.) curable resin, photo initiators and modifiers.

Accordingly, once the desired mixture having any desired colorant, resin, and/or additive is coated onto the glass particles, the glass particles are cured or dried at 160. Curing can occur through any technique known and available to one of ordinary skill in the art, such as, but not limited to, an oxidation process, a heat process, a radiation process, a catalyst process, and others. The curing secures the mixture to the surface of the glass particles to provide surface protection. The mixture can also include other benefits such imparting a desired color associated with any colorant included within the mixture, and the like.

The resulting coated glass particles can be used in a variety of new and useful products, such as, but not limited to, decorative landscaping, garden mulch, playground mulch, golf course, road coatings, and others. One of ordinary skill in the art now appreciates and comprehends how glass waste can be transformed into products that can be beneficial and used in the marketplace. Moreover, these products are coated with the mixture such that any rough edges associated with the particles are eliminated. Further, any residual heavy metals that may remain on the surface of the particles are safely and securely encapsulated by the coating. This can further ensure that undesirable heavy metals do not leach into the environment, is such heavy metals remain on the surface of the glass particles.

Figure 2:
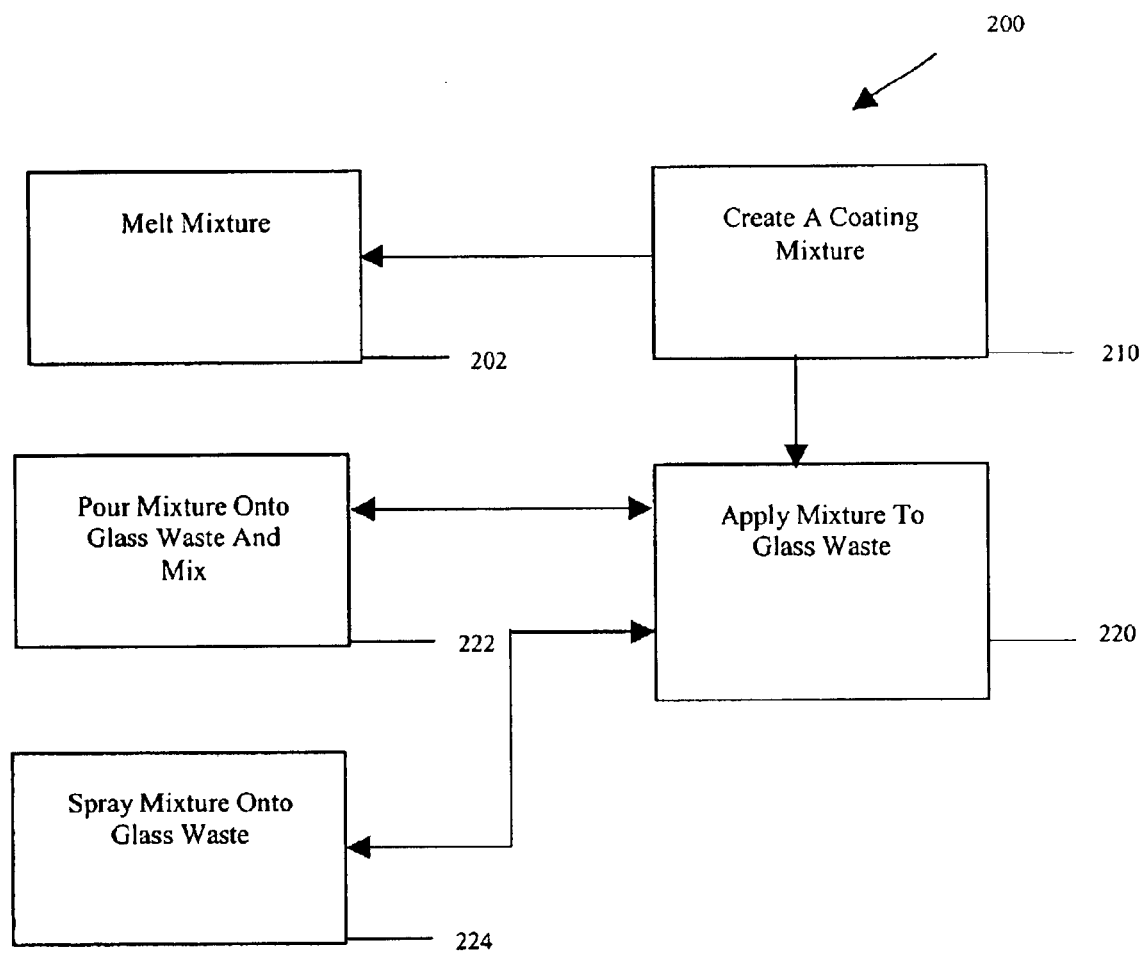
FIG. 2 is a flowchart of another method for coating glass waste, according to one embodiment of the present invention.

FIG. 2 illustrates a flowchart of another method 200 for coating glass waste, according to one embodiment of the present invention. The glass waste can be acquired from previous treated environmentally hazardous glass waste, such as CRT monitors, television monitors, and others. Moreover, the glass waste can be acquired from normal and non-hazardous sources, such as household glassware, and the like.

The glass waste consists of glass particles having a diameter of less than approximately ½ inch and more than 1 millimeter. At 210, a mixture that is to be used to coat the glass waste is created. The mixture includes a resin, a curing agent, a flow modifier, an adhesion modifier, a colorant, and a solvent. In one embodiment, the mixture consists of 10% to 90% of a water-soluble epoxy resin, 1% to 20% of an amine curing agent, 0.1% to 5% of a flow modifier, 0.1% to 5% of an adhesion modifier, 0.1% to 40% of a colorant, and 0.1% to 40% of water. Of course, one of ordinary skill in the art appreciates that other additives can be used as well, and all such additives are intended to fall within the scope of the present disclosure when added to the mixtures of the present invention.

In some embodiments, the mixture may be a solid at room temperature and thus at 212 the mixture is melted. At 220, the mixture is applied to the glass waste. Pouring the mixture onto the glass waste and mixing the glass waste with the mixture, as depicted at 222, can be used to apply the mixture. Alternatively, at 224, the mixture can be applied to the glass waste using a sprayer. In still other embodiments, the mixture can be applied using U.V. or E.B techniques, as discussed above.

Once the mixture is applied or coated on the glass waste, the mixed is cured or dried on the glass waste. The glass waste can now be marketed as new useful products, such as, but not limited to, decorative landscaping, garden mulch, playground mulch, golf course sand, road coatings, and others. Moreover, the coated mixture serves to eliminate hazards that may normally be associated with the glass waste before being coated with the mixtures that can be created with the tenets of the present invention. Thus, the glass waste is nonabrasive and non-toxic and can be successfully used in commercial products. The glass waste can also be custom pigmented to achieve various colors and or visual effects that may be desired in the marketplace.

Furthermore, in some embodiments of the present invention, the glass waste can be coated multiple times with different variations of the mixtures produced by the present invention. Thus, visual effects and appearances of the glass waste can be refined to achieve any special desire or visual appearance desired in the marketplace.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method to coat glass waste, comprising:
   crushing glass into glass particles, wherein each of the glass particles are less than approximately ½ inch in diameter and greater than approximately 1 millimeter in diameter;
   washing the glass particles;
   drying the glass particles; and
   coating each of the glass particles with a mixture including a universal resin, a curing agent, a flow modifier, and a colorant.

2. The method of claim 1 further comprising curing the coated glass particles by using at least one of an oxidation process, a heating process, a radiation process, and a catalyst process.

3. The method of claim 2 wherein in coating, the mixture is sprayed onto the glass particles.

4. The method of claim 2 wherein in coating, the mixture is mixed with the glass particles.

5. The method of claim 1 wherein the mixture includes 10% to 90% of the universal resin, 1% to 20% of the curing agent, 0.1% to 5% of the flow modifier, and 0.1% to 40% of the colorant.

6. The method of claim 1 wherein in coating, the mixture further includes at least one of an adhesion modifier, an abrasion modifier, an Ultra Violet (U.V.) absorber, and a solvent.

7. The method of claim 1 wherein in coating, the mixture coats the glass particles to a thickness of at least 0.1 micron.

8. A method to coat glass waste, comprising:
   coating glass waste with a mixture, wherein the mixture includes a universal resin, a solvent, a flow modifier, an adhesion modifier, a curing agent, and a colorant, and wherein the mixture is sprayed onto the glass waste; and curing the coated glass waste.

9. The method of claim 8 wherein in coating, the mixture includes 10% to 90% of the universal resin, 1% to 20% of the curing agent, 0.1% to 40% of the solvent, 0.1% to 5% of the flow modifier, 0.1% to 5% of the adhesion modifier, 1% to 20% of the curing agent, and 0.1% to 40% of the colorant.

10. The method of claim 8 wherein in coating, the colorant includes at least one of organic pigments, inorganic pigments, iron oxides, dyes, and color imparting compounds.

11. The method of claim 8 wherein in coating, the universal resin includes at least one of epoxies, phenol formaldehyde resins, amino resins, polyamides, vinyl resins, acrylic resins, polyurethane resins, cellulosic resins, bitumen rosins, lignin rosins, wood rosins, and gum rosins.

12. The method of claim 8 wherein in coating, the solvent includes at least one water, alcohols, aromatic solvents, aliphatic solvents, esters, and glycols.

13. The method of claim 8 wherein in coating, the curing agent includes at least one of amines, isocyanides, photo initiators, acids, and bases.

14. A method to coat glass waste, comprising:

creating a mixture including a universal resin, a colorant, a curing agent, and a flow modifier;

applying the mixture to glass waste, and wherein the mixture is applied by spraying it onto the glass waste; and curing the glass waste with the applied mixture.

15. The method of claim 14 wherein in creating, the universal resin is an epoxy resin and the curing agent is an amine-curing agent.

16. The method of claim 14 wherein in applying, the mixture is uniformly applied to the glass waste.

17. The method of claim 14 wherein in applying, the mixture encapsulates the glass waste to prevent contaminants associated with the glass waste from leaching out of the glass waste.

18. The system of claim 14 wherein in applying, the mixture reduces rough edges associated with the glass waste.

19. Glass waste coated with a mixture, wherein said mixture comprises:

a universal resin, which is a water-soluble epoxy resin;

a curing agent;

a flow modifier;

an adhesion modifier;

a colorant; and a solvent.

20. The glass waste of claim 19, wherein the mixture is sprayed onto the glass waste and cured onto the glass waste.

21. Glass waste coated with a mixture, wherein said mixture comprises:

10% to 90% a universal resin;

1% to 20% of a curing agent;

0.1% to 5% of a flow modifier;

0.1% to 5% of an adhesion modifier;

0.1% to 40% of a colorant; and 0.1% to 40% of a solvent and wherein the universal resin is a water-soluble epoxy resin, the curing agent is amine, and the solvent is water.

* * * * *